Jan. 11, 1927.

L. W. CLOSE 1,613,819

TORCH

Filed August 6, 1926

INVENTOR
Lyman W. Close
BY
Owen & Owen
ATTORNEYS

Patented Jan. 11, 1927.

1,613,819

UNITED STATES PATENT OFFICE.

LYMAN W. CLOSE, OF TOLEDO, OHIO, ASSIGNOR TO THE TOLEDO PRESSED STEEL COMPANY, OF TOLEDO, OHIO, A CORPORATION OF OHIO.

TORCH.

Application filed August 6, 1926. Serial No. 127,492.

This invention relates to torches but more particularly to torches of the type used in connection with road repair or construction work for danger signals, and an object of this invention is to provide a torch with a counter weight for maintaining the torch in upright position which is mounted in the torch body in a simple and efficient manner enabling such counter weight to be fixedly secured in place readily and cheaply. Further objects and advantages will hereinafter appear.

The invention is shown by way of illustration in the accompanying drawings, in which—

Figure 1:
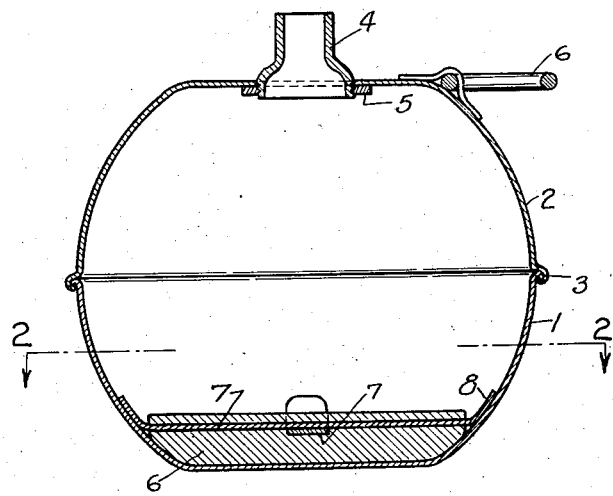
Figure 2:
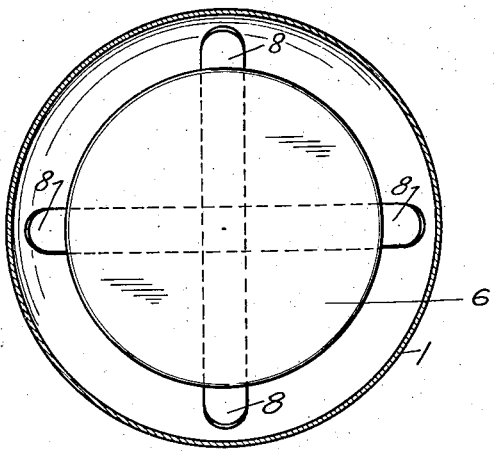
Figure 3:
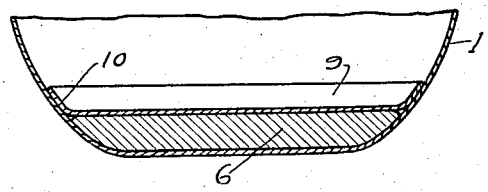

Fig. 1 is a vertical sectional elevation of a torch embodying the invention; Figure 2 is a section on the line 2—2 of Figure 1; and Figure 3 is a detail sectional elevation of an alternate form.

The illustrated embodiment of the invention comprises a torch of sheet metal having a body portion formed of two parts, a base part 1 and an upper part 2. The bottom and top of the torch body are flattened and the side walls are rounded. In this instance, the adjoining edges of the top and bottom parts are seamed together as shown at 3. Formed centrally in the top of the upper part is an opening into which fits a spout or nozzle 4 screwed into a ring 5 spot welded to the inside of the torch body. A handle ring 6 may be suitably connected to the side of the torch to facilitate handling.

In torches of this character, it is highly desirable to provide a counter weight so that at all times an upright position is maintained and so that the torches are self-righting should they be knocked over. As shown a counter weight 6 is placed in the bottom of the torch body and is shaped to conform to the side walls of the torch body.

For securely holding the counter weight in place a pair of straps 7 spot welded together is embodied in the counter weight with the ends 8 projecting therefrom. The counter weight 6 may be cast around the straps so that a unitary arrangement is formed. The projecting ends 8 of the strap are bent upwardly to lie flat against the inner wall of the torch body. These ends are preferably spot welded to the torch so that the counter weight 6 is fixedly secured in place.

In the alternate form shown in Figure 2, the counter weight 6$^a$ is similar in shape to the counter weight 6, but instead of utilizing straps to hold it in place, a cup-shaped member 9 rests against the top of the counter weight and has its edge portions 10 bent to conform to the inner wall of the torch body. The edge portions are spot welded at intervals to the torch so that relative movement between the counter weight 6$^a$ and torch body is prevented.

While I have described my improved torch in more or less detail to comply with the requirements of this statute, it is nevertheless desired that this detailed description be considered merely as illustrative and not as limiting, and it is to be understood that changes and modifications may be made by those skilled in this art without departing from the invention as defined in the following claims.

What I claim is:

1. A torch comprising a body having a flat base and curved walls, a counter weight inside of said body and conforming to the side walls thereof, holding means extending across the upper portion of said counter weight, and upwardly bent end portions on said holding means to conform to the inside of said body, said upwardly bent portions being rigidly secured to the inside of said body thereby to hold said counter weight against movement.

2. A torch comprising a two part body, the lower part having a flat base and curved side walls, the upper part having curved side walls and a flat top, a seam connecting said parts together, a nozzle in the top of said upper part, a counter weight in said lower part having sides conforming to the shape of the side walls of the body, straps embedded in said counter weight, and upwardly bent end portions on said straps projecting beyond the ends of said counter weight and lying flat against the body, said bent end portions being secured to said body.

3. A torch comprising a two part body, the lower part having a flat base and curved side walls, the upper part having curved side walls and a flat top, a seam connecting said parts together, a nozzle in the top of said upper part, a counter weight in said lower part having sides conforming to the shape of the side walls of the body, a retaining member engaging the upper portion of said counter weight and upwardly bent edges on said member conforming to the shape of the inner walls of said body, said upwardly bent edges being rigidly secured to said body thereby to retain said counter weight in place.

In testimony whereof I have hereunto signed my name to this specification.

LYMAN W. CLOSE.